United States Patent [19]

Hutchings

[11] 4,311,627

[45] Jan. 19, 1982

[54] PROCESS FOR CURING FOUNDRY CORES AND MOLDS

[75] Inventor: David A. Hutchings, Stow, Ohio

[73] Assignee: Consolidated Foundries and Mfg. Corp., Chicago, Ill.

[21] Appl. No.: 201,750

[22] Filed: Oct. 29, 1980

[51] Int. Cl.$^3$ .............................................. C08K 5/15
[52] U.S. Cl. .................... 260/30.4 R; 260/32.8 R; 260/38; 260/42.43; 260/998.18; 164/21
[58] Field of Search ................. 260/30.4 R, 32.8 R, 260/38, 42.43, 998.18, DIG. 40; 164/21, 43, 361

[56] References Cited

U.S. PATENT DOCUMENTS

| | | | |
|---|---|---|---|
| 3,008,205 | 11/1961 | Blaies, Jr. | 260/37 EP |
| 3,108,340 | 10/1963 | Peters et al. | 260/39 R |
| 3,145,438 | 8/1964 | Kottke et al. | 260/37 EP |
| 3,639,654 | 2/1972 | Robins | 260/37 R |
| 3,870,731 | 3/1975 | Hutchings | 260/396 R |
| 3,879,339 | 4/1975 | Richard | 260/38 |
| 4,176,114 | 11/1979 | Stewart | 260/37 R |
| 4,269,758 | 5/1981 | Richard | 260/38 |

Primary Examiner—Lewis T. Jacobs
Attorney, Agent, or Firm—Alfred D. Lobo

[57] ABSTRACT

A process is disclosed for curing a sand-furan resin mixture used in foundry practice to form cores and molds by the use of sulfur dioxide gas without forming sulfuric acid. Curing occurs when the furan resin, that is one containing a predominant amount of a furan moiety, is intermixed with a minor amount of a diisopropylbenzene monohydroperoxide (DIPBMHP) or diisopropylbenzene dihydroperoxide (DIPBDHP), or a mixture thereof. In addition to reacting with gaseous sulfur dioxide without forming sulfuric acid, these specific alkaryl hydroperoxides of which the monohydroperoxides have at least one alkyl ring substituent, have the peculiar characteristic of curing the resin in such a way that the DIPBMHP or DIPBDHP moiety becomes chemically bound in the cured resin. The result is a cured core or mold having a novel composition and superior physical properties compared to prior art cores and molds made with furan resins, in which the reaction with sulfur dioxide produces sulfuric acid. Cores and molds made by the instant process perform as well as, or better than those made with hexamethylene tetramine initiated thermally polymerized phenol-formaldehyde novolac resins, when used under comparable shell casting conditions.

11 Claims, No Drawings

PROCESS FOR CURING FOUNDRY CORES AND MOLDS

BACKGROUND OF THE INVENTION

It is common practice in the foundry art to form cores and molds in desired shapes from a sand-resin composition which can be cured at foundry room temperatures. Typically, a granular aggregate such as sand is combined with a minor amount of a polymerizable resin sufficient to act as a binder when the resin on the sand is polymerized with an initiator for the resin.

More particularly, foundries currently use processes comprising gas-curing a foundry sand mixed with a wide variety of polymerizable resins which are cured with one or more of numerous curing agents. The preparation of cores and molds using such processes is taught in U.S. Pat. Nos. 3,008,205; 3,108,340; 3,121,368; 3,145,438; 3,639,654; and 3,879,339 (hereafter "'339" for brevity) inter alia. Though these prior art cores and molds have gained varying degrees of commercial acceptance, each has certain drawbacks. Some cores and molds are difficult to form into average patterns, or require an uneconomically long period of time for curing them; others have inferior tensile strength and other undesirable characteristics such as a proclivity to generate surface cracks; yet other are impractical because they use a binder which is too unstable to be commercially profitable; in addition to one of the foregoing drawbacks cores and molds may have still others which are less serious.

It is of particular interest that no prior art reference suggests that an acid-curable resin may be cured by gassing with sulfur dioxide ($SO_2$) without the formation of sulfuric acid. Several references indicate that it essential to generate sulfur trioxide as a precursor of the sulfuric acid, and in the '339 patent Richard teaches the formation of sulfuric acid without the formation of sulfur trioxide, but no reference teaches the curing of a furan resin without the formation of sulfuric acid. Nor does any reference teach that it would be desirable that the structure of the cured or polymerized resin should be modified by chemically incorporating therewithin an aralkyl initiator moiety with an alkyl substituent on the ring, which moiety inculcates highly desirable characteristics into the polymerized resin of the cured core or mold.

This invention is specifically directed to a novel process in which a sand-furane resin mixture containing a minor amount of diisopropylbenzene monohydroperoxide (DIPBMHP) or diisopropylbenzene dihydroperoxide (DIPBDHP) substantially homogeneously intermixed in the resin, is cured by gassing with sulfur dioxide in such a way that an intermediate acid sulfate is formed instead of sulfuric acid, and the DIPBMHP or DIPBDHP moiety becomes chemically bound in the polymer formed. The resulting cured resin binds the sand to provide a core or mold of exceptional strength because of the unique properties of the resin containing a DIPBMHP or DIPBDHP moiety.

Particularly referring to the '339 patent, Richard discovered that by employing sulfur dioxide in combination with an oxidizing agent it was possible to generate sulfuric acid in situ without forming sulfur trioxide. Because of this process it was possible to cure an acid curing resin in a period of a few seconds to a few minutes at ambient temperatures while obtaining homogeneous products with high flexural strengths. Specifically with respect to a furane or furane copolymer type resin optionally modified by furfuryl alcohol or by unsaturated epoxidized compounds, Richard teaches that polymerization of the resin is effected by alkyl or aralkyl hydroperoxide, hydrogen peroxide, alkyl peroxides such as methylethylketone peroxide or t-butyl hydroperoxide, and the specific alkaryl hydroperoxide, cumene hydroperoxide. With the use of each of these oxidizing agents there results the direct formation of sulfuric acid without the formation of sulfur trioxide. From the mechanisms and theoretical considerations delineated in the '339 patent, it is clear that formation of sulfuric acid contraindicates the formation of an acid sulfate of the hydroperoxide, which acid sulfate could then generate a carbonium ion to initiate the polymerization of the resin and then become chemically bound in its structure. Neither DIPBMHP or DIPBDHP reacts with the sulfur dioxide in the manner disclosed by Richard; nor is an analogous polymerized end product formed.

SUMMARY OF THE INVENTION

It has been discovered that a foundry sand coated with a resin the major portion of which contains a furan moiety (which resin is hereafter referred to as a "furan resin" for brevity) and then formed into a core or mold, may be cured very rapidly at ambient temperature with sulfur dioxide gas without the formation of sulfuric acid, if the resin has dispersed therewithin a minor amount by weight (compared to the resin) of (a) an aralkyl monohydroperoxide containing at least one isopropyl substituent on the aromatic ring, or (b) diisopropylbenzene dihydroperoxide (DIPBDHP) with or without an alkyl substituent on the benzene ring, or (c) a mixture of (a) and (b).

It has also been discovered that when or an aralkyl monohydroperoxide containing an isopropyl substituent, or DIPBDHP, or a mixture of such mono-and dihydroperoxides is mixed into a furan resin which is then deposited on a foundry sand, the resin can be polymerized rapidly by gassing with sulfur dioxide without the formation of sulfuric acid in such a way that the aralkyl moiety of the hydroperoxide initiates the polymerization reaction by formation of an acid sulfate which in turn generates a carbonium ion which reacts with the resin and is chemically bound within the structure of the polymerized resin to yield a novel sand and cured-resin composition.

It is therefore a general object of this invention to provide a process for the preparation of cores and molds from a mixture of sand coated with a furan resin in which is dispersed a minor amount by weight of a mixture of diisopropylbenzene monohydroperoxide (DIPBMHP) and DIPBDHP, and contacting the mixture with gaseous sulfur dioxide at a temperature in the range from about 5° C. to about 100° C., so as to initiate polymerization of the resin without the formation of sulfuric acid in such a way that an isopropylbenzene moiety, which additionally may contain an isopropyl substituent on the benzene ring, is introduced into the chemical structure of the polymerized resin.

It is a specific object of this invention to utilize a byproduct stream obtained from the oxidation section of a commercial hydroquinone plant, as the bottoms from a "stripper" in the section, to provide the hydroperoxides required in the process of this invention. This bottoms stream is rich in DIPBMHP and is referred to as the "MOX stripper bottoms". This stream comprises a mixture of DIPBMHP and DIPBDHP in a ratio in the range from about 98:2 to about 70:30 respectively by weight, and minor quantities, less than about 20 percent by weight (% by wt) of the MOX stripper bottoms, of other compounds. These compounds include various contaminants such as polymerization retarders. Despite the presence of these other compounds, the byproduct MOX stripper bottoms stream may be used to effect the polymerization of a furan resin mixed with sand when the mixture is contacted with gaseous sulfur dioxide. The polymerization is effected without the formation of sulfuric acid.

DETAILED DESCRIPTION OF A PREFERRED EMBODIMENT

As is well known to those skilled in the art, the chemical and physical properties of organic peroxides and hydroperoxides range so far and wide that the behavior of specific hydroperoxides in any chosen system is most difficult to predict successfully. In fact, the decomposition products of peroxides are often complex and vary markedly with changes in the external environment. (See the chapter titled "Decomposition of Organic Peroxides" in the textbook "Organic Peroxides Their Chemistry, Decomposition and Role in Polymerization", Arthur V. Tobolsky and Robert B. Mesiobian, pp 57, Interscience Publishers, Ltd. London 1954). We are concerned here only with a polyisopropyl-substituted benzene monohydroperoxide (PIPBMHP), or diisopropylbenzene dihydroperoxide (DIPBDHP), and mixtures thereof in a polymerizable resin containing a furan moiety, and more specifically those resins containing a major proportion by weight of furfuryl alcohol, which resins are polymerized by contact with gaseous sulfur dioxide at ambient temperatures in the range from about 50° F. to about 120° F. Higher temperatures may be used if there is an economic incentive for doing so, even though this is a 'cold box' process.

This invention utilizes the discovery that in an aralkyl hydroperoxide, and particularly an isopropylbenzene monohydroperoxide, the presence of at least one isopropyl substituent, or a second isopropyl hydroperoxide substituent on the benzene ring, whether either or each substituent is present in the molecule in the meta- or the para- position relative to the isopropyl hydroperoxide substituent, changes the reaction characteristics of the molecule in a predominantly furan resin binder compared with those of cumene hydroperoxide in the same binder, when polymerization of the binder is effected with gaseous sulfur dioxide. Relatively pure DIPBMHP may be used, for example, as obtained by the peroxide-initiated autooxidation of diisopropyl benzenes. The presence of a minor quantity of DIPBDHP in a mixture with DIPBMHP has been found to be of special benefit in producing a cured resin binder for cores and molds having excellent physical properties because the aralkyl moiety of the hydroperoxide becomes chemically combined in the structure of the cured polymer. The unexpected effect of an alkyl substituent on the phenyl ring is documented in numerous instances, for example in the oxidation of ring-substituted alkyl phenols in the production of benzoquinone as described in my U.S. Pat. No. 3,870,731 (see col 6, lines 26 et seq). When the presence of the substituent accounts for a highly favorable rate of reaction, its benefit becomes of considerable commercial significance.

As described by Richard in the '339 patent with particular respect to a furan resin, among many other resins, oxidizing agents such as hydrogen peroxide, methylethylketone peroxide, alkyl hydroperoxides such as t-butyl hydroperoxide and the specific aralkyl monohydroperoxide cumene hydroperoxide (also referred to as cumyl hydroperoxide) which has no isopropyl substituent on the benzene ring, among many other oxidizing agents, each effects polymerization of the resin by the direct formation of sulfuric acid ($H_2SO_4$) without the formation of sulfur trioxide. As Richard indicates, such a reaction would not proceed under anhydrous conditions; further, such a reaction produces alcohols as byproducts. Under the conditions of a cold box $SO_2$-gassing process using a furan resin, the alcohol formed is not incorporated into the structure of the polymerized resin by being chemically bound therein. The reaction disclosed in the '339 patent occurs with a host of oxidizing agents in any acid curing organic resin, but does not occur with ring-substituted aralkyl monohydroperoxides or aralkyl dihydroperoxides used in a furan resin, in relatively small amounts, at ambient temperature conditions and substantially atmospheric pressure.

In contrast with oxidizing agents in general which may be used with any acid curing organic resin in a cold box process using sulfur dioxide to cure a furan resin containing a minor amount of DIPBMHP or DIPBDHP or a mixture thereof, it is critical in my invention that the polymerization of the resin be effected by conversion of the DIPBMHP or DIPBDHP to the corresponding acid sulfate which then initiates polymerization of the resin and participates in the reaction so that the DIPBMHP or DIPBDHP moiety becomes a part of the reacted polymer. This critical formation of this acid sulfate without the formation of sulfuric acid, is corroborated by J. C. W. Chien and C. R. Boss in an article titled "Sulfur Compounds as Synergistic Antioxidants", J. Polym. Sci. 10, 1579-1600 at 1593 (1972). It is this acid sulfate polymerization product, formed as an intermediate, which produces a cured binder with distinct and more desirable properties than a binder cured in a core or mold formed from a furan resin in which the hydroperoxide moiety is not a reacted constituent of the polymer. By introducing the DIPBMHP and/or DIPBDHP moiety into the polymerized resin's structure, the molecular weight of the resin is increased and the resin is stabilized by the presence of the aromatic constituent. Because such a stabilized resin has a lower tendency to 'gas', it can be used with a higher loading, that is more resin per unit weight of sand, than prior art $SO_2$-gas cured furan resins. Thus thin-walled cores and molds of this invention are comparable in weight to shell molds made by the conventional hot-shell process which uses a "hexacured" phenol formaldehyde system.

That formation of the acid sulfate is critical if it is to initiate the polymerization of the furan resin so as to become chemically bound in the reacted polymer, is evidenced by production of a carbonium ion without the formation of rearrangement products such as p-isopropyl phenol. Had a sufficient amount of sulfuric acid been formed, p-isopropyl phenol would be generated. This reaction would not assist in the polymerization. Moreover, if p-isopropyl phenol were formed, it would readily be detected by its potent malodor. This carbonium ion can only be derived from an acid sulfate as explained in Chien, supra. Thereafter, the carbonium ion initiates a reaction with the furan resin in such a way as to become part of the reacted polymer structure, as evidenced by the high rate of reaction forming the polymer, a result which typifies the high activity of the carbonium ion. As will be evident from data presented hereinafter, the presence of the isopropyl group on the benzene ring, in addition to the isopropyl monohydroperoxide substituent generates a carbonium ion which initiates polymerization to a more stable product than can be obtained with cumene hydroperoxide or methylethyl ketone peroxide. The presence of the addition product of the carbonium ion and furan resin is readily confirmed by IR and NMR analysis of the cured polymer.

With cumene hydroperoxide, as taught by Richard, cumyl alcohol is formed. It is well known that cumyl alcohol does not readily become chemically bonded in this type of furan polymerization product, so it is evident that the cured resin formed by using cumene hydroperoxide and sulfur dioxide is quite different from the cured resin formed in the DIPBMHP and/or DIPBDHP initiated reaction.

Since my process requires a reaction in which the aralkyl moiety is chemically bound in the polymer, which reaction occurs in seconds and is very fast, it is clear that the polymer can only be derived from a carbonium ion generated from the acid sulfate, as shown below:

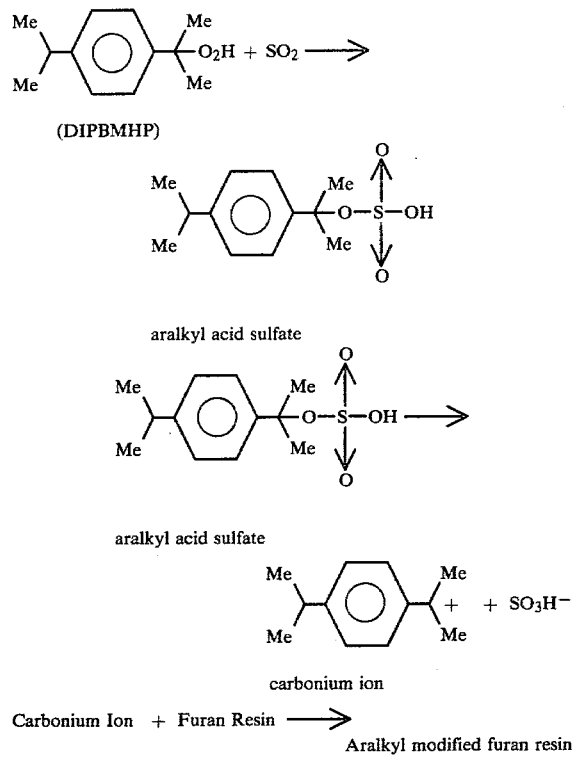

Had the acid sulfate decomposed to give either an alcohol or an olefin neither would be incorporated into the polymer even if there was sulfuric acid present. This is substantiated by the well-recognized fact that hydrogen acids such as sulfuric acid are usually less active than even Lewis acids and give only low polymers in cationic polymerizations. Even where styrene is polymerized with a Lewis acid, the rates are relatively much slower than that obtained with $SO_2$ and the DIPBMHP or DIPBDHP (see "Polymer Processes" by Calvin E. Schildknecht, under the subheading "Cationic Polymerizations" pp 201, under the chapter titled "Ionic Polymerizations", Interscience Publishers, New York 1956).

Further, Richard indicates the necessity of the presence of moisture for his process to proceed with the formation of sulfuric acid without the formation of sulfur trioxide. My process relies on a reaction which proceeds without difficulty under anhydrous conditions, yet can tolerate the presence of some moisture, preferably in an amount less than 5% by wt of resin, if the moisture is present. That my reaction proceeds under anhydrous conditions is evidenced by the following simple experiment:

A. 10 g of a mixture of DIPBMHP and DIPBDHP in the ratio of about 8:2 by weight are placed in a beaker and 10 g of furfuryl alcohol-ureaformaldehyde resin (Air-Kure 657-X obtained from Delta Oil Co.) were added thereto. Then 150 g of pentane were stirred into the mixture and allowed to settle into separate phases. The pentane phase containing DIPBMHP and DIPBDHP and furfuryl alcohol was introduced into a three-necked flask and heated to reflux. A small amount of water was removed from the system as evidenced by a slight cloudiness in the initial condensate. The solution was refluxed for an additional 15 min at the end of which period the flask was sealed and allowed to cool to room temperature. Then gaseous dry $SO_2$ is sparged into the flask for about 30 secs causing a rapid reaction as evidenced by heat evolved and the color changes in the flask, resulting in a dark polymer coating the walls.

It will be apparent that the rate of cure can be increased by using higher process temperatures, or undiluted sulfur dioxide gas at as high a pressure as the core or mold can withstand, or by the generation of sulfuric acid in the core or mold in addition to the acid sulfate formed as a precursor of the carbonium ion. It is well known that sulfuric acid is exceptionally active and provides a fast cure of a furan resin if the acid is generated as described in the '339 patent and other references. Also, if desired, a plasticizer such as dimeththylterephthalate may be added to give flexibility to the core or mold so as to permit contraction and expansion. Still further, a wash, for example an aqueous dispersion of silica or zirconia flour mixed with appropriate binders and dispersing agents known in the art, may be used after the core or mold is cured, to obtain a desired high finish.

From a practical point of view, the use of ring-substituted aralkyl hydroperoxides has several advantages of great commercial significance. For example, a DIPBMHP or DIPBDHP or a mixture thereof is non-explosive. It is well-known that MEK peroxide currently used is highly heat sensitive and detonates. In contrast, ring-substituted aralkylhydroperoxides may be held at 100° C. for a substantial period of time without detonating or degrading. Commercially available mixtures of 1-isopropyl-4-isopropylbenzene monohydroperoxide-and 3-isopropyl-4-isopropylbenzene monohydroperoxide (DIPBMHP) are shipped in tank cars. The cores and molds made according to the instant invention are virtually odorless due to the absence of volatile components after polymerization. For example, with cumene hydroperoxide the odor is intolerable. These properties of the cured cores and molds have health and safety advantages which are so self-evident they can scarcely be overstated. In addition to these advantages, the cores and molds produced have superior tensile strength, and retention of the tensile strength when heated (hot strength) compared to any prior art cores and molds using furan resins.

In a particular specific embodiment of this invention, a waste stripper bottoms stream obtained as the bottoms from a MOX stripper used in the oxidation section of a hydroquinone plant (more fully described in Chemical Engineering, by A. H. Olzinger, June 9, pp 50–51, 1975, and incorporated by reference as if fully set forth herein) is used in a cold box process using a furan resin which is gassed with $SO_2$. This MOX stripper bottoms stream contains a mixture of DIPBMHP and DIPBDHP along with various other byproducts such as p-dimethyl carbinol-cumene hydroperoxide (MOXOL), p-dimethyl carbinol-cumene (MONOL), benzene-bis-[1,4-dimethylcarbinol](DIOL) and diisopropyl benzene, any one of which may be present in an amount up to about 20% by wt of the MOX stripper bottom stream, depending upon the operation of the oxidizer in the oxidizer section of the hydroquinone plant. In addition, there may be polymerization retarders which quite surprisingly, do not interfere with the polymerization of a sand-furan resin mixture containing the organic heavys. A particularly desirable MOX stripper bottoms stream contains a mixture of DIPBMHP and DIPBDHP in a ratio in the range from about 98:2 to about 70:30 respectively.

In a typical core or mold, less than 10 parts by weight of furan resin are mixed with 100 parts by weight sand. The resin typically contains less than 50 percent by weight of DIPBMHP or DIPBDHP or a mixture thereof. It is preferred to use from about 5 to about 33 parts by weight of DIPBMHP or DIPBDHP, or a mixture thereof, per 100 parts by weight of resin, the particular amount chosen depending upon the furan content of the resin, the other components of the resin, the type of sand, and the process conditions for curing the core or mold, inter alia. These hydroperoxides are preferably mixed into the resin and coated on the sand just prior to being gassed with $SO_2$, though a resin containing these hydroperoxides is stable for weeks, and a sand-furan resin mixture containing these hydroperoxides is sufficiently stable to be stored for a substantial period up to about a week, prior to being gassed. The stability of the resin-hydroperoxide mixture is enhanced by decreasing the amount of phenolic resin in the resin.

Because the furan resin is cured without the formation of sulfuric acid and the ring-substituted aralkyl moiety is incorporated into the chemical structure of the cured polymer, a core or mold made from a sand-furan resin mixture containing DIPBMHP and/or DIPBDHP and gassed with $SO_2$ has either greater strength or more desirable metal casting characteristics than prior art cores or molds formed from furan resins containing either alkyl peroxides or hydroperoxides such as methylethylketone (MEK) peroxide, or even cumene hydroperoxide, when each peroxide or hydroperoxide is compared on an equivalent active oxygen basis. This is evidenced by the following tests made with sample tensile specimens made from a sand-furan resin recipe given hereinbelow, to each batch of which is added (i) MEK peroxide, (ii) cumene hydroperoxide, and (iii) a mixture of DIPBMHP and DIPBDHP.

In each case, 3624 g of clean Rockwood 75 silica sand was placed in a Hobart paddle type mixer and mixed while 1.5 g of trimethoxy aminosilane in solution were added dropwise. The mixing is continued for about 3 min to allow the silane solution to contact all the grains of sand. Then 45 g of Air Kure 657-X (obtained from Delta Oil Co.), a predominantly furan resin containing about 70–80% by wt furfuryl alcohol including dimers and trimers thereof, and about 20–30% by wt of urea-formaldehyde resin, is added while mixing. The major proportion by weight of the resin is a condensation product of furfuryl alcohol sometimes with aldehydes, particularly formaldehyde.

(i) To one batch of sand and furan resin mixed as described immediately hereinabove, there is added 17 g of a standard 50% solution of methylethylketone peroxide in dimethylterephthalate while the batch is mixed in the Hobart mixer for 2 min (this batch is hereafter referred to as the "MEKP batch"). (ii) To a second batch of sand-furan resin mixture is slowly added 22 g of a 70% solution of cumene hydroperoxide in cumene, while mixing for 2 mins. ("cumene batch"). And, (iii) to a third batch of sandfuran resin mixture is slowly added 22 g of a MOX stripper bottoms mixture of DIPBMHP and DIPBDHP, again while mixing for 2 mins. ("MOX batch").

Each of the three batches was used to prepare standard AFS tensile test samples by using the standard procedure. The test samples were cured by contact with $SO_2$ gas for 1 second at 75° F., the gas being obtained from a cylinder through a pressure regulator set at 20 psi. The gassed specimens were then tested for tensile at varying intervals from the time each sample was gassed. The results are set forth hereinbelow in Table 1 in which all resin loadings are 1.25%.

TABLE 1

| MEK batch | | Cumene batch | | MOX batch | |
|---|---|---|---|---|---|
| Time (min) | Tensile (psi) | Time (min) | Tensile (psi) | Time (min) | Tensile (psi) |
| 3 | 76 | 1 | 32 | 5 | 120 |
| 7 | 116 | 3 | 60 | 10 | 188 |
| 12 | 140 | 7.5 | 100 | 16 | 184 |
| 16 | 124 | 12 | 116 | 20 | 200 |
| 21 | 152 | 16 | 136 | 24 | 212 |
| o'night | 204 | 20 | 144 | o'night | 304 |
| | | 60 | 148 | | |
| | | o'night | 265 | | |

In an analogous manner, additional batches were mixed up using the same amounts of the reactants and resin but only 1812 g of the sand so as to give a 2.5% by wt resin loading. In the following Table 2 hereinbelow there is set forth tensile data at varying intervals after gassing the sample.

TABLE 2

| MEK batch | | Cumene batch | | MOX batch | |
|---|---|---|---|---|---|
| Time (min) | Tensile (psi) | Time (min) | Tensile (psi) | Time (min) | Tensile (psi) |
| 7.5 | 144 | 7 | 108 | 6 | 192 |
| 16 | 200 | 7 | 112 | 7 | 192 |
| 65 | 268 | 15 | 160 | 15 | 288 |
| 150 | 248 | 23 | 172 | 23 | 304 |
| 150 | 288 | 90 | 284 | 95 | 372 |

From the foregoing Tables 1 and 2 it is evident that samples made from the MOX batch cured upon gassing to give tensiles which are consistently higher than those obtained with either the MEK or the Cumene batches. Clearly, for any desired tensile, less resin is used in the MOX batch than with either of the other batches.

In a comparison of samples from each batch at 2.5% resin loading, the hot strengths were compared by heating each sample for the same short period of time in a muffle furnace maintained at 1470° F. All samples were placed on a piece of transite so that each was subjected to heat for exactly the same period of time. The samples were tested for tensiles after they cooled to about 100° F. so that they could be handled comfortably. The results are set forth hereinbelow in Table 3.

TABLE 3

| Time (secs) | MEK batch Tensile (psi) | Cumene batch Tensile (psi) | MOX batch Tensile (psi) |
|---|---|---|---|
| 30 | 184 | 228 | 272 |
| 60 | 188 | 276 | 360 |

From the foregoing Table 3 it is evident that samples made with the MOX batch retain high tensile strengths, higher than the other batches, even after being subjected to a temperature of 1470° F. for as long as 1 min.

To compare the performance of samples made with the MOX batch with samples made from a conventional "hexa cured" Novolak resin such as is used for making cores and molds in the conventional hot-shell casting process, the following experiment is performed.

To 1000 g of Rockwood 75 silica sand heated to 350° F. there is addded 20 g of Acme 1128 resin (obtained from Acme Resin Co.) which is a typical phenolic hot-shell resin. The resin melts and while the sand is being mixed, 2.4 g of hexamethylenetetramine dissolved in 10 ml of water are added. After build-up and breakdown of the sand-resin mixture, it is crushed and screened through a 40 mesh U.S. Standard sieve. The sieved material is used to make standard "hot plate" tensile specimens which are maintained at 350° F. for 3 mins, and then allowed to cool. The average tensile of these specimens made with the Acme resin was 250 psi. Additional specimens were subjected to 1470° F. in a muffle furnace with air atmosphere for 60 secs, removed and allowed to cool. The cooled specimens gave an average tensile of 135 psi. It is evident from these data compared with those given in Tables 1 and 2 hereinabove that the samples made from the MOX batches were superior in tensile and heat strength to the samples made with the hot-shell resin.

Since it is presently contemplated that the MOX stripper bottoms stream be used rather than a pure DIPBMHP stream, it must be recognized that the DIPBDHP in the stream will settle out as a solid if there is an insufficient amount of p-diisopropylbenzene in the stream to keep it in solution. To ensure against the DIPBDHP settling out, any solvent for the material may be used which will not be deleterious to the making of the cores or molds, or injurious to the health and safety of the personnel in the foundry. Some solvents which may be used, and the solubility of DIPBDHP in these solvents are listed in Table 4 hereinbelow.

With respect to the use of DIPBMHP and DIPBDHP, whether pure or mixed with byproducts or contaminants, it will also be recognized that, a minor proportion by weight of these hydroperoxides with at least one alkyl (in the case of DIPBMHP), or alkyl hydroperoxide (in the case of DIPBDHP) substituent, compared to the weight of resin in the sand-resin mixture, is generally adequate to produce the desired cure in a reasonably short period of time. However, a much greater amount of either or both of these peroxides, up to a combined amount equivalent to the weight of resin may be used, if economically justified.

TABLE 4

| Solvent | % solubility |
|---|---|
| Furfuryl alcohol | 5 |
| Furfural | 8 |
| Tetrahydrofurfuryl alcohol | 17 |
| Cyclohexanone | 26 |
| Cyclohexanol | 2 |
| Isopropyl alcohol | 12 |
| Toluene | 4 |
| Ethylene glycol | 8 |
| Dimethylphthalate | 4 |
| Acetone | 22 |

In a comparison of samples from each of the aforementioned batches made with a 2.5% by wt resin loading, all the samples were simultaneously subjected to a temperature of 1470° F. in a muffle furnace with an air atmosphere, and visually inspected at intervals of 30 secs until all visible surfaces of the specimens were converted to ash. The samples were then removed, and it was observed that while still hot, only the sample from the MOX batch was essentially odorless. This sample, upon testing, also showed that it had higher scratch resistance and greater tensile strength than samples made from either the MEK batch or the cumene batch. This greater stability and strength can only be attributed to the stabilization of the cured polymer by virtue of the introduction of the diisopropylbenzene moiety into its structure.

It will be recognized that though the MOX stripper bottoms stream has two or more isopropyl substituents on the phenyl ring, other alkyl substituents may be introduced on the ring if so desired, by any well known means. Such alkyl substituents may include from 1 to about 5 carbon atoms, for example t-butyl.

I claim:

1. A process for curing a core or mold made from a predominantly furan resin deposited on foundry sand, comprising, dispersing a ring-substituted aralkyl hydroperoxide so as to coat said sand, contacting said resin with sulfur dioxide gas at a temperature in the range from about 5° C. to about 100° C. to form an acid sulfate intermediate by combining with said hydroperoxide, and polymerizing said resin without the formation of sulfuric acid so as to chemically bind an aralkyl moiety in the structure of the polymerized resin.

2. The process of claim 1 wherein said ring-substituted aralkyl hydroperoxide is selected from the group consisting of isopropylbenzene monohydroperoxide having an alkyl substituent on the phenyl ring, and, diisopropylbenzene dihydroperoxide, and mixtures thereof.

3. The process of claim 2 wherein said isopropylbenzene monohydroperoxide having an alkyl substituent on the phenyl ring is selected from the group consisting of 4-isopropyl-1-isopropylbenzene monohydroperoxide and 3-isopropyl-1-isopropylbenzene monohydroperoxide, and mixtures thereof.

4. The process of claim 2 wherein said diisopropylbenzene dihydroperoxide is selected from the group consisting of p-diisopropylbenzene dihydroperoxide and m-diisopropylbenzene dihydroperoxide.

5. The process of claim 2 wherein said alkyl substituent on the ring includes from about 1 to about 5 carbon atoms.

6. The process of claim 2 wherein said alkyl substituent is isopropyl.

7. The process of claim 6 wherein said isopropylbenzene monohydroperoxide with an isopropyl substituent and said diisopropylbenzene dihydroperoxide are present in a stripper bottoms stream obtained as the bottoms from a stripper for diisopropylbenzene monohydroperoxide in the oxidation section of a plant for the production of hydroquinone.

8. A core or mold for use in the casting of a molten metal comprising, a foundry sand coated with a predominantly furan resin which is curable by contact with gaseous sulfur dioxide, said resin having dispersed therein a ring-substituted aralkyl hydroperoxide selected from the group consisting of isopropylbenzene monohydroperoxide having an alkyl substituent, and, diisopropylbenzene dihydroperoxide, and mixtures thereof.

9. The core or mold of claim 9 including a solvent for said diisopropylbenzene dihydroperoxide, said solvent being selected from the group consisting of tetrahydrofurfuryl alcohol, cyclohexanone and acetone.

10. A core or cold for use in the casting of a molten metal comprising, a foundry sand coated with a predominantly furan resin having dispersed therein a ring-substituted aralkyl hydroperoxide selected from the group consisting of isopropylbenzene monohydroperoxide having an alkyl substituent on the phenyl ring, and, diisopropylbenzene dihydroperoxide, and mixtures thereof, said core or mold being cured by contact with gaseous sulfur dioxide at a temperature in the range from about 5° C. to about 100° C. without the formation of sulfuric acid.

11. A composition of matter comprising a foundry sand coated with a polymerized furan resin formed by gassing said resin with gaseous sulfur dioxide in the presence of isopropylbenzene monohydroperoxide having an alkyl substituent on the phenyl ring, and, diisopropylbenzene dihydroperoxide, and mixtures thereof so as to chemically bind an aralkylmoiety in the structure of said polymerized resin.

* * * * *